Figure 1:
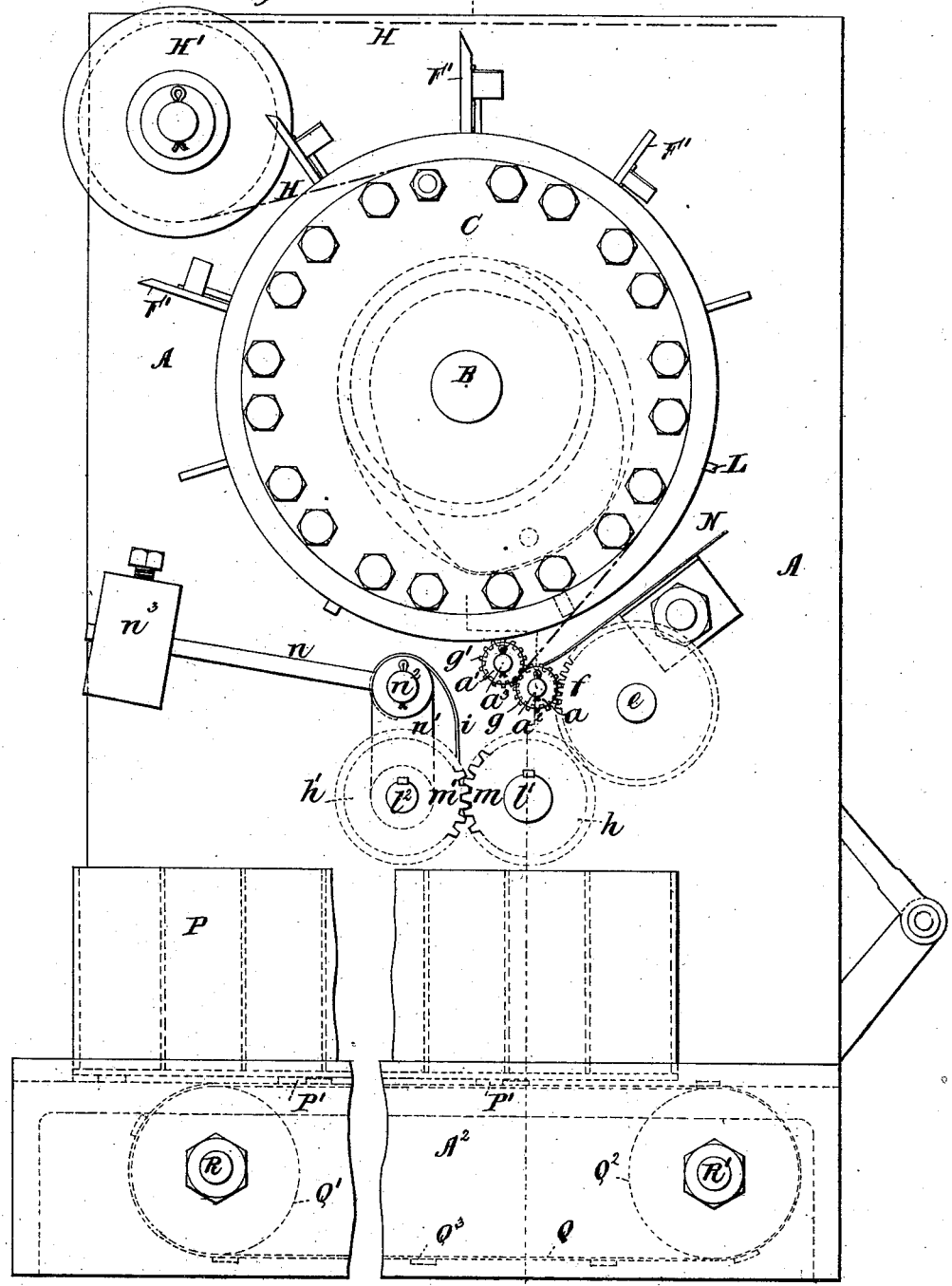

(No Model.) 12 Sheets—Sheet 1.

W. R. BACON.
CUTTING AND DELIVERING APPARATUS.

No. 370,672. Patented Sept. 27, 1887.

Witnesses
Percy B. Hills.
Robert Prestt.

Inventor:
Walter R. Bacon,
By James L. Norris.
Atty.

(No Model.) 12 Sheets—Sheet 4.

W. R. BACON.
CUTTING AND DELIVERING APPARATUS.

No. 370,672. Patented Sept. 27, 1887.

Witnesses,
Percy B. Hills.
Robert Everett.

Inventor
Walter R. Bacon,
By James L. Norris.
Atty.

(No Model.) 12 Sheets—Sheet 5.
W. R. BACON.
CUTTING AND DELIVERING APPARATUS.
No. 370,672. Patented Sept. 27, 1887.
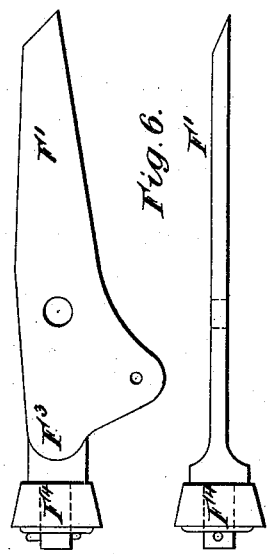
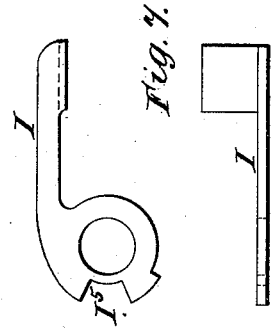
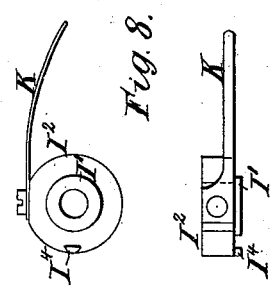
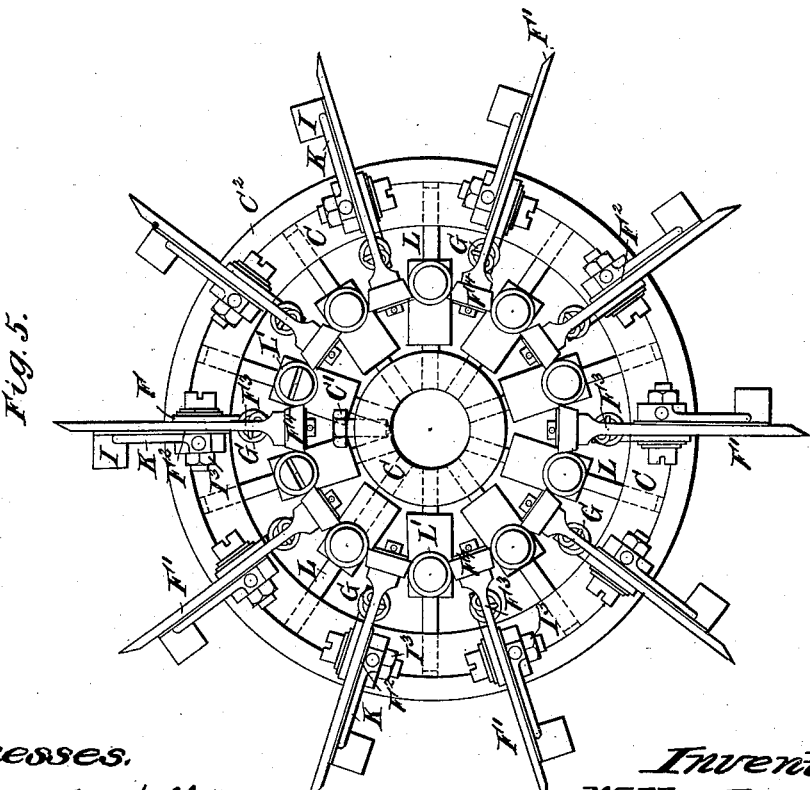
Witnesses.
Percy B. Hills.
Robert Everett.
Inventor.
Walter R. Bacon.
By James L. Norris
Atty.

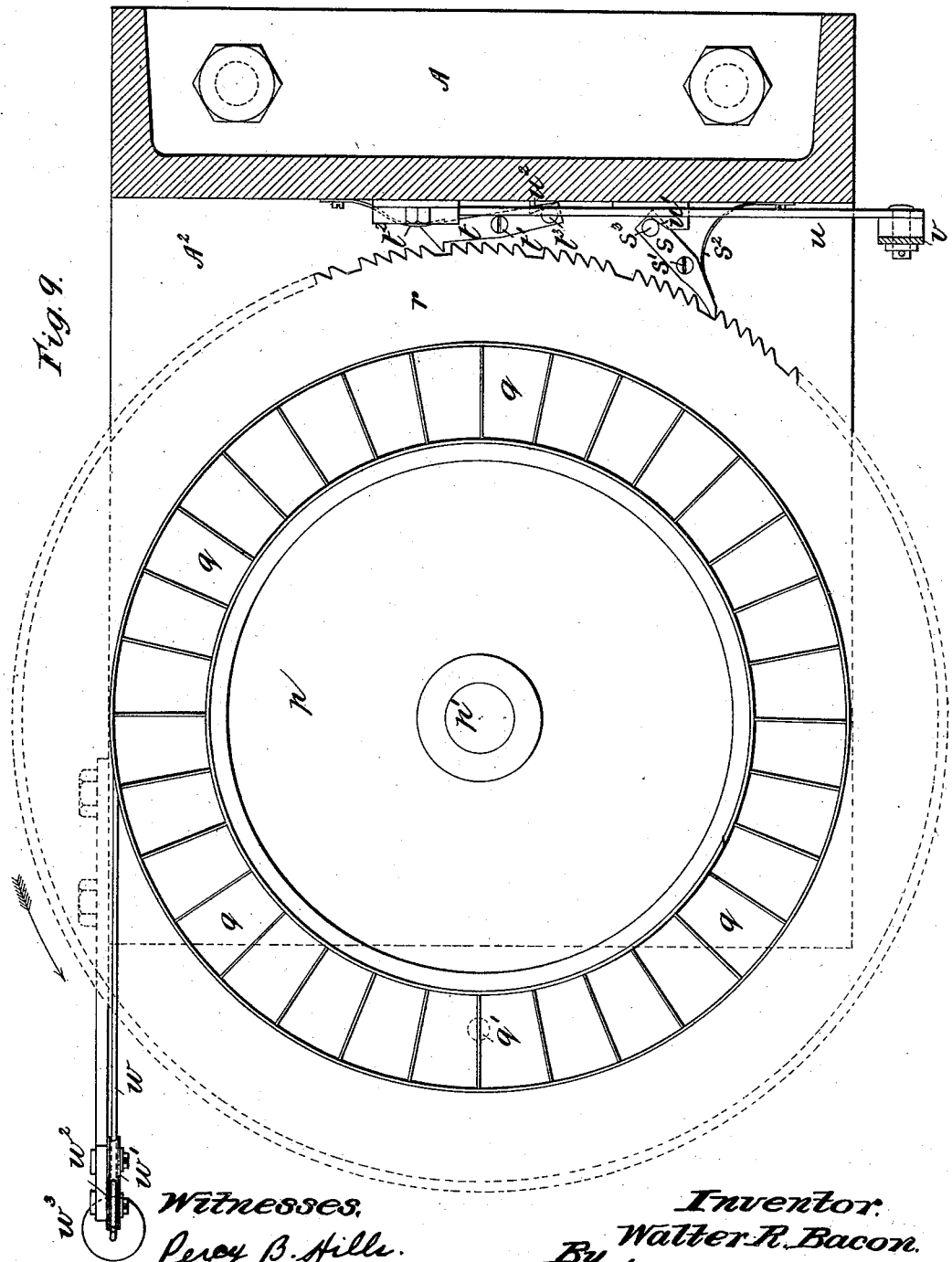

(No Model.) 12 Sheets—Sheet 7.
W. R. BACON.
CUTTING AND DELIVERING APPARATUS.
No. 370,672. Patented Sept. 27, 1887.
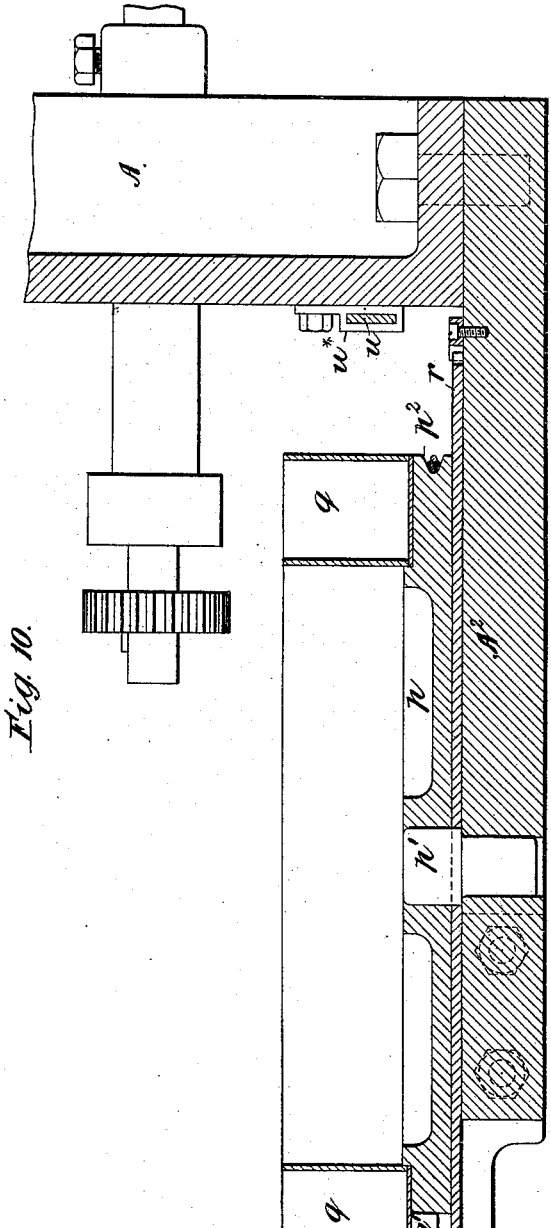
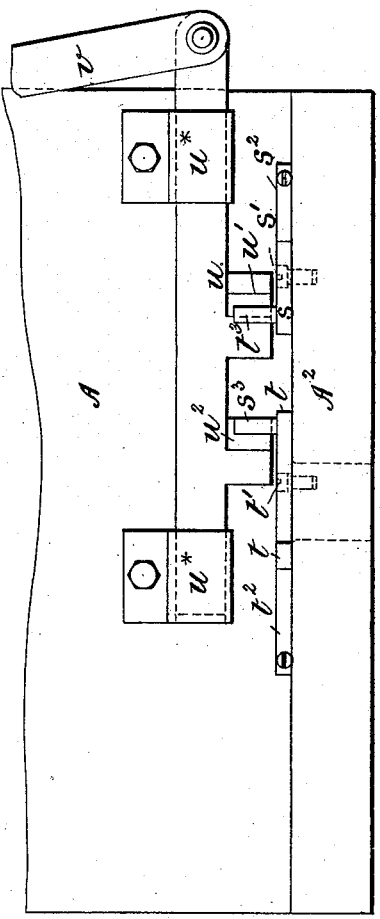
Witnesses,
Percy B. Hills.
Robert Everett.
Inventor:
Walter R. Bacon.
By James L. Norris.
Atty.

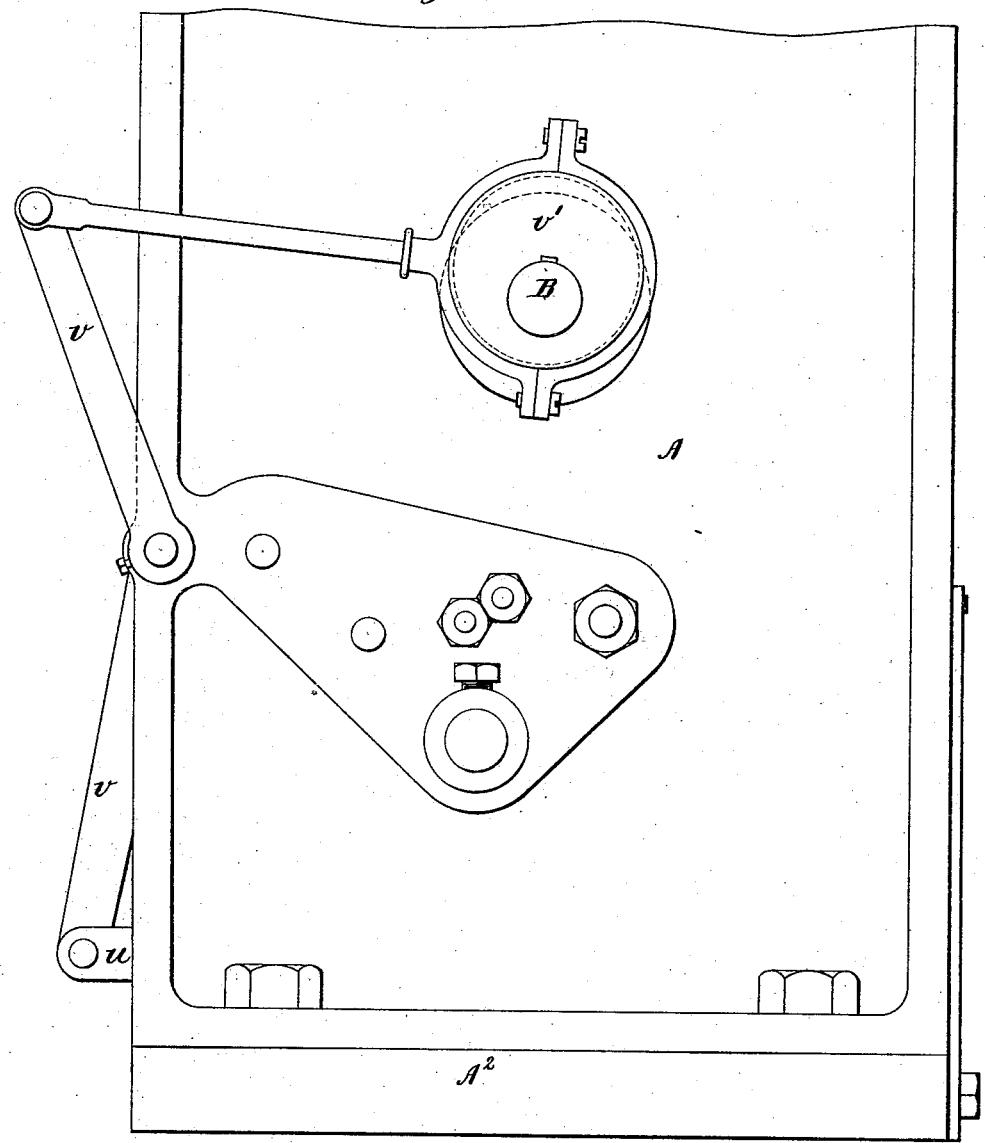

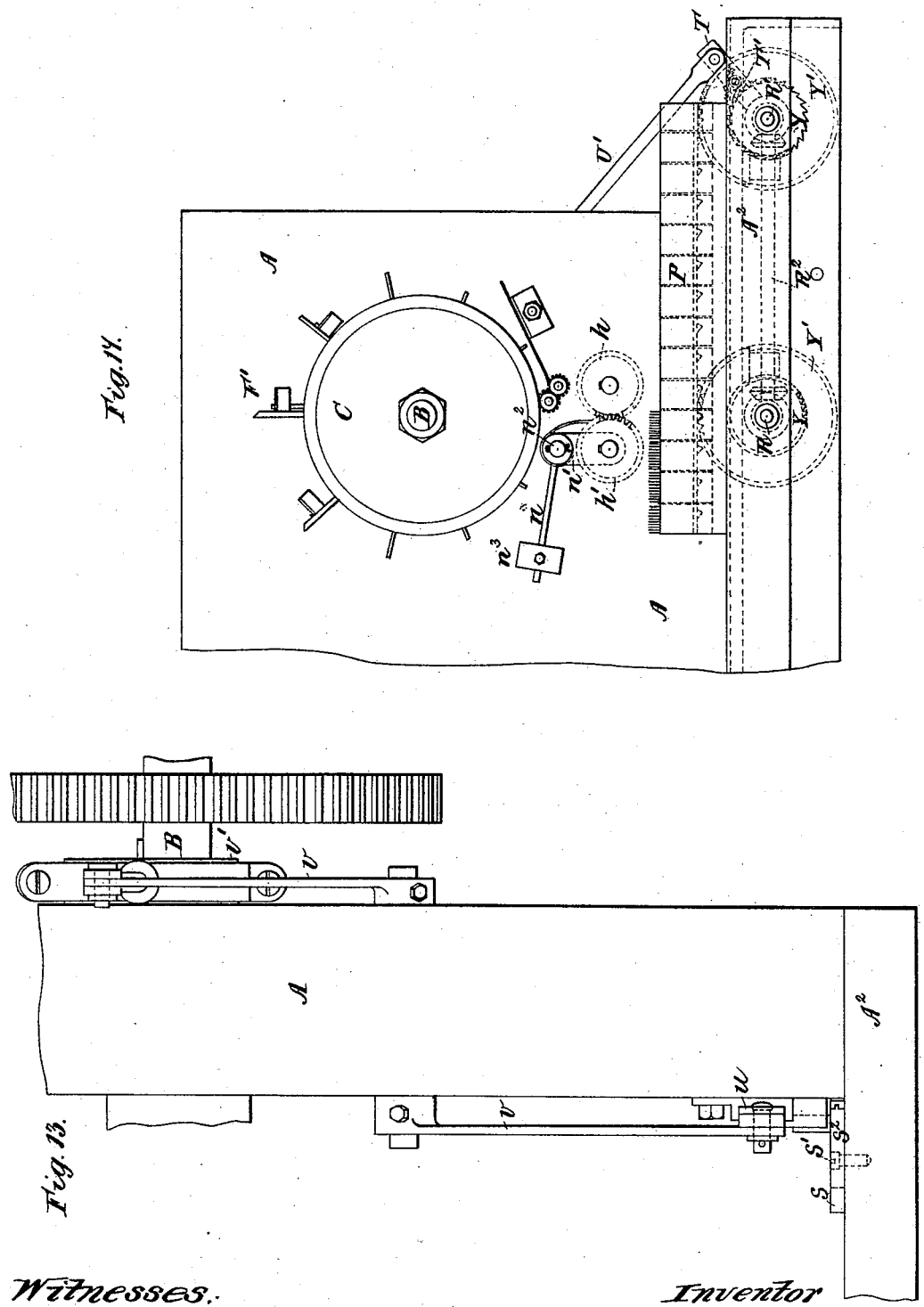

(No Model.) 12 Sheets—Sheet 10.
W. R. BACON.
CUTTING AND DELIVERING APPARATUS.
No. 370,672. Patented Sept. 27, 1887.
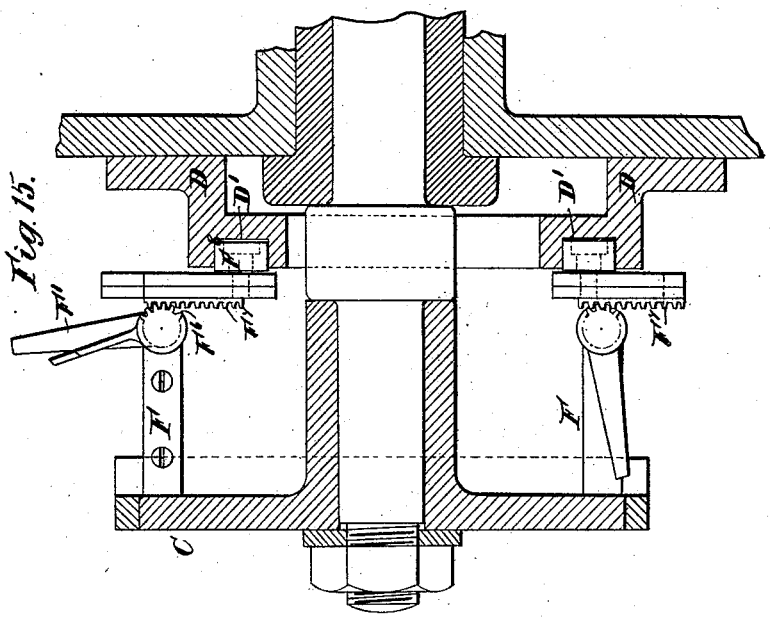
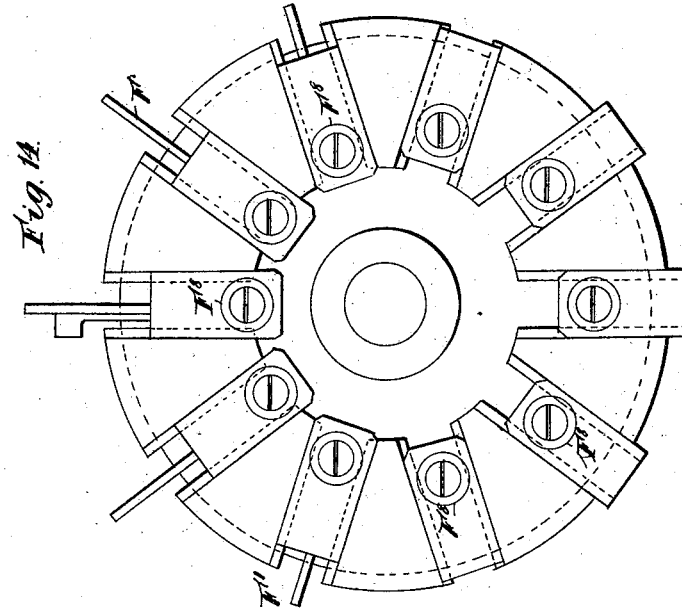
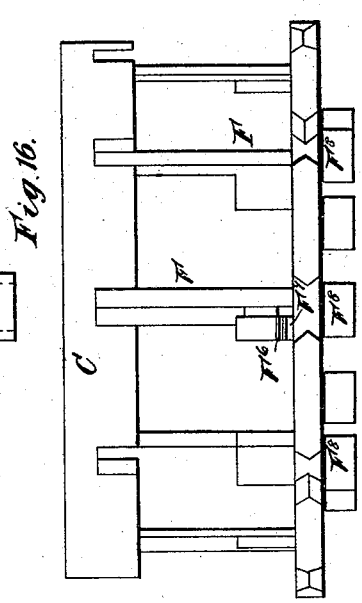
Witnesses,
Percy B. Hills.
Robert Pruitt.
Inventor
Walter R. Bacon,
By James L. Norris.
Atty.

(No Model.) 12 Sheets—Sheet 11.
W. R. BACON.
CUTTING AND DELIVERING APPARATUS.
No. 370,672. Patented Sept. 27, 1887.
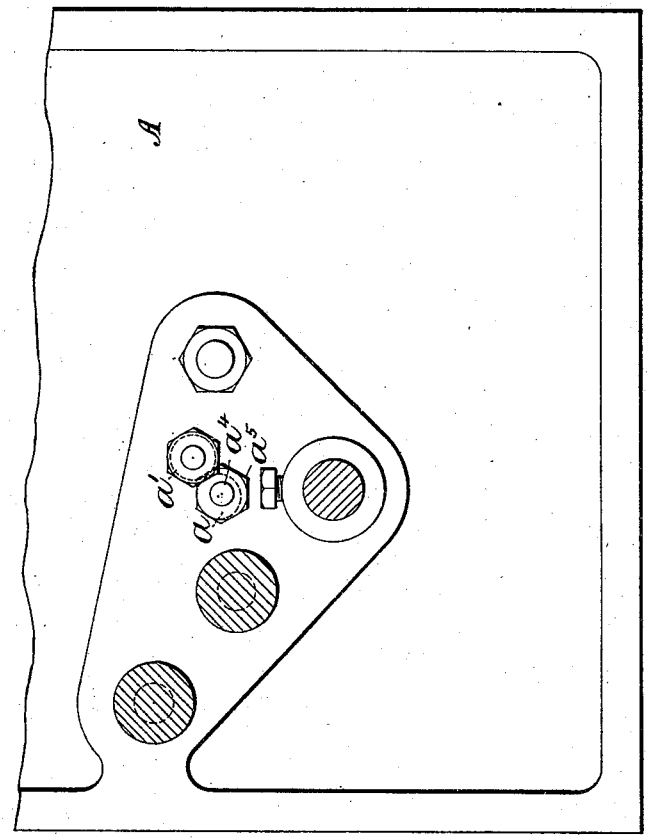
Witnesses,
Percy B. Hills.
Robert Everett.
Inventor,
Walter R. Bacon.
By James L. Norris.
Atty.

(No Model.)  12 Sheets—Sheet 12.
W. R. BACON.
CUTTING AND DELIVERING APPARATUS.
No. 370,672.  Patented Sept. 27, 1887.
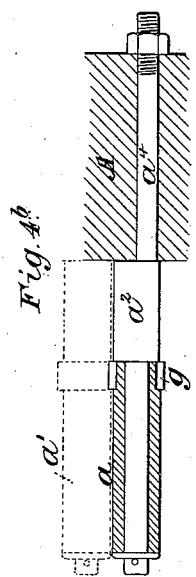
Witnesses.
Geo. W. Rea
Robert Everett
Inventor.
Walter R. Bacon,
By James L. Norris.
Atty.

UNITED STATES PATENT OFFICE.

WALTER RATHBONE BACON, OF LONDON, ENGLAND.

CUTTING AND DELIVERING APPARATUS.

SPECIFICATION forming part of Letters Patent No. 370,672, dated September 27, 1887.

Application filed April 7, 1886. Serial No. 198,159. (No model.) Patented in England November 22, 1884, No. 15,416.

*To all whom it may concern:*

Be it known that I, WALTER RATHBONE BACON, a citizen of the United States of America, residing at London, England, have invented new and useful Improvements in and relating to Cutting and Delivering Apparatus, chiefly designed for dividing strips of paper or other material into tickets, labels, or the like, and arranging the same in consecutive order for distribution, (for which I have obtained a patent in Great Britain, No. 15,416, bearing date November 22, 1884,) of which the following is a specification, reference being had to the accompanying drawings.

This invention relates to machinery or apparatus chiefly designed for cutting or dividing strips of paper or pasteboard into tickets and arranging the said tickets in consecutive order, in boxes or otherwise, for subsequent distribution, but also applicable for cutting or dividing strips of other material—such as metal—into pieces of equal length.

The said apparatus is sometimes used in combination with mechanism for printing and consecutively numbering tickets, in which case the continuous strip of paper or pasteboard is conducted directly from the printing and numbering mechanism to the cutting apparatus.

The invention consists in the several novel features of construction and combinations of parts, hereinafter fully described, and definitely pointed out in the claims.

Figure 2:
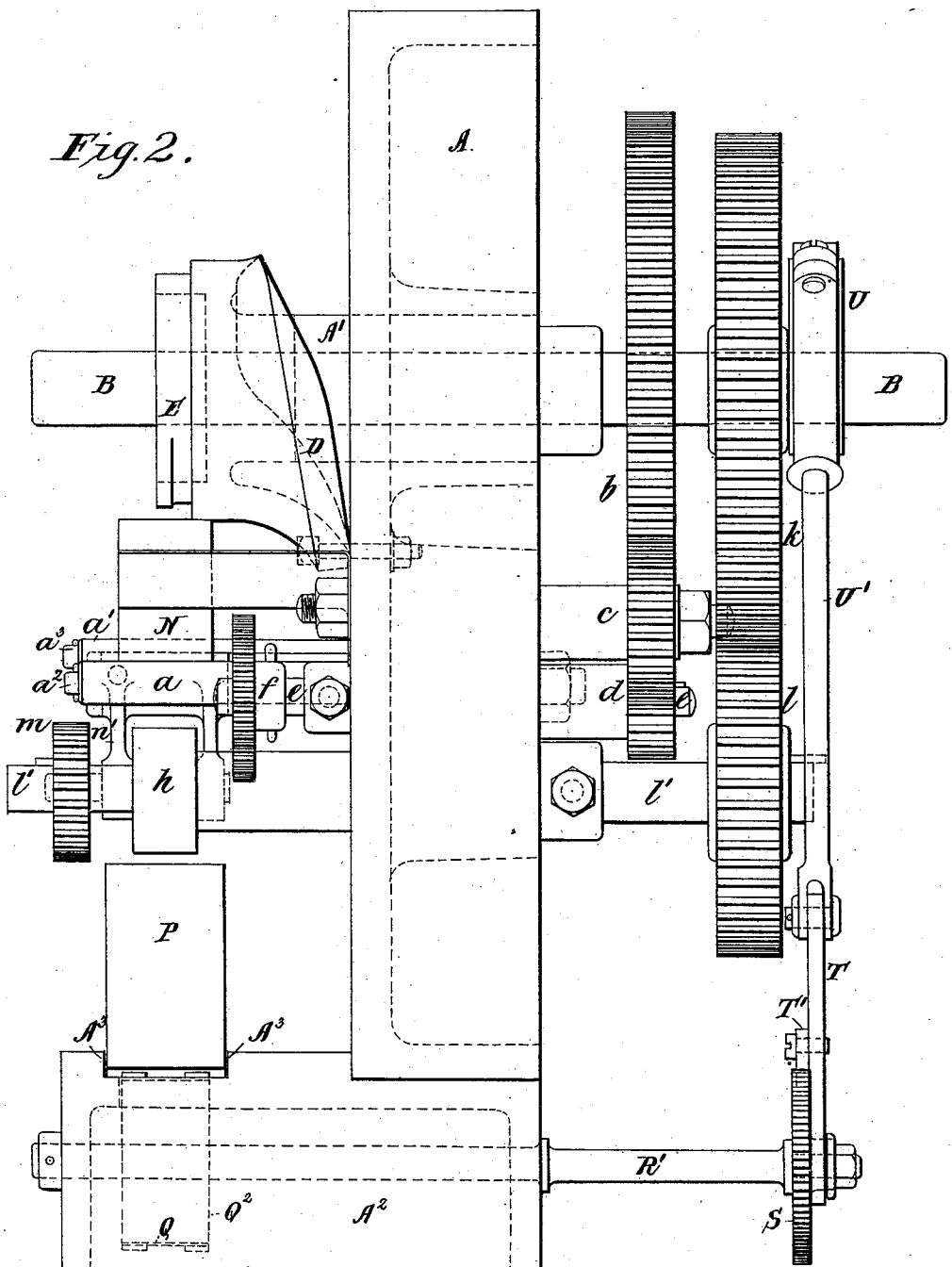
Figure 3:
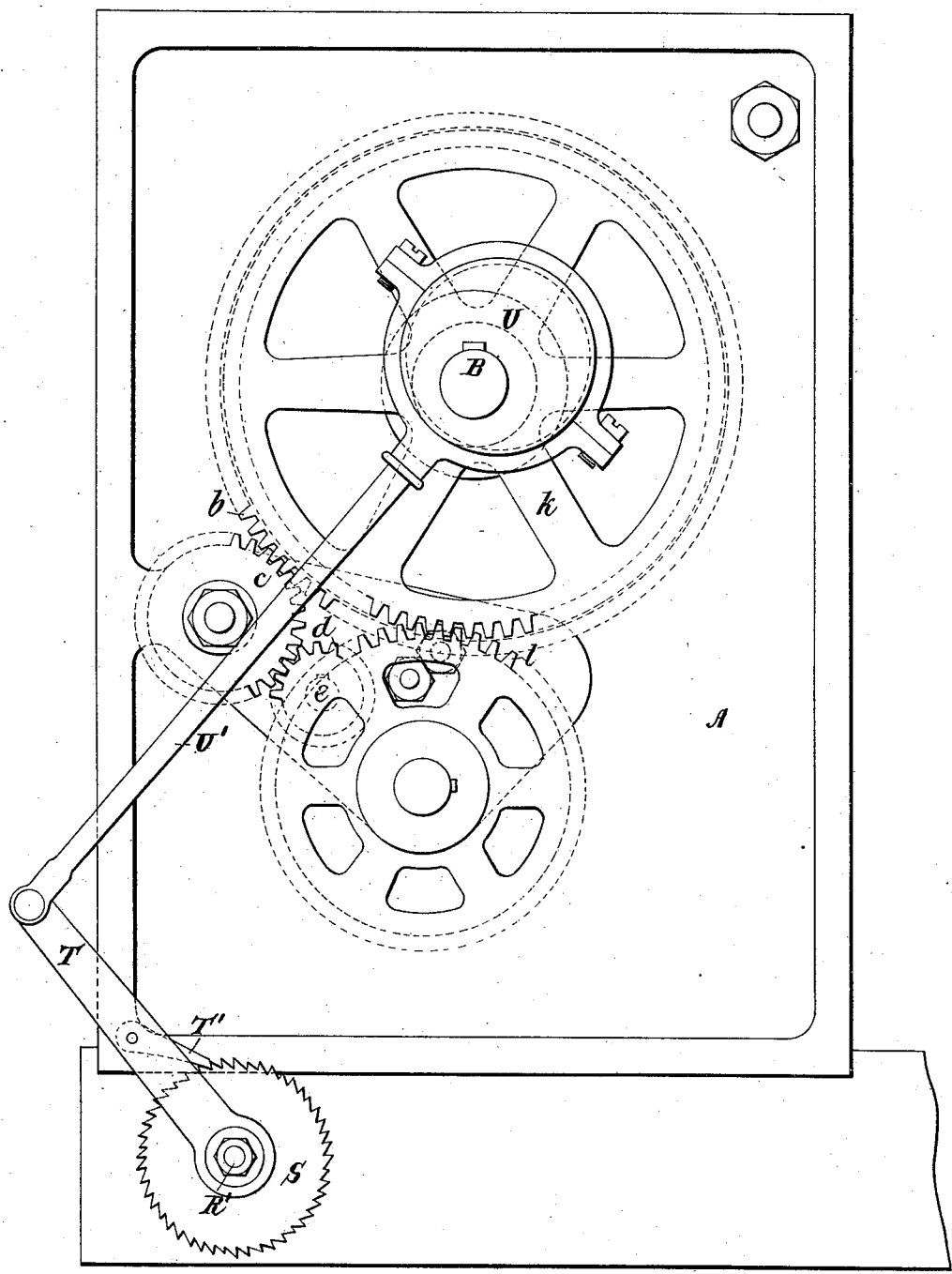
Figure 4:
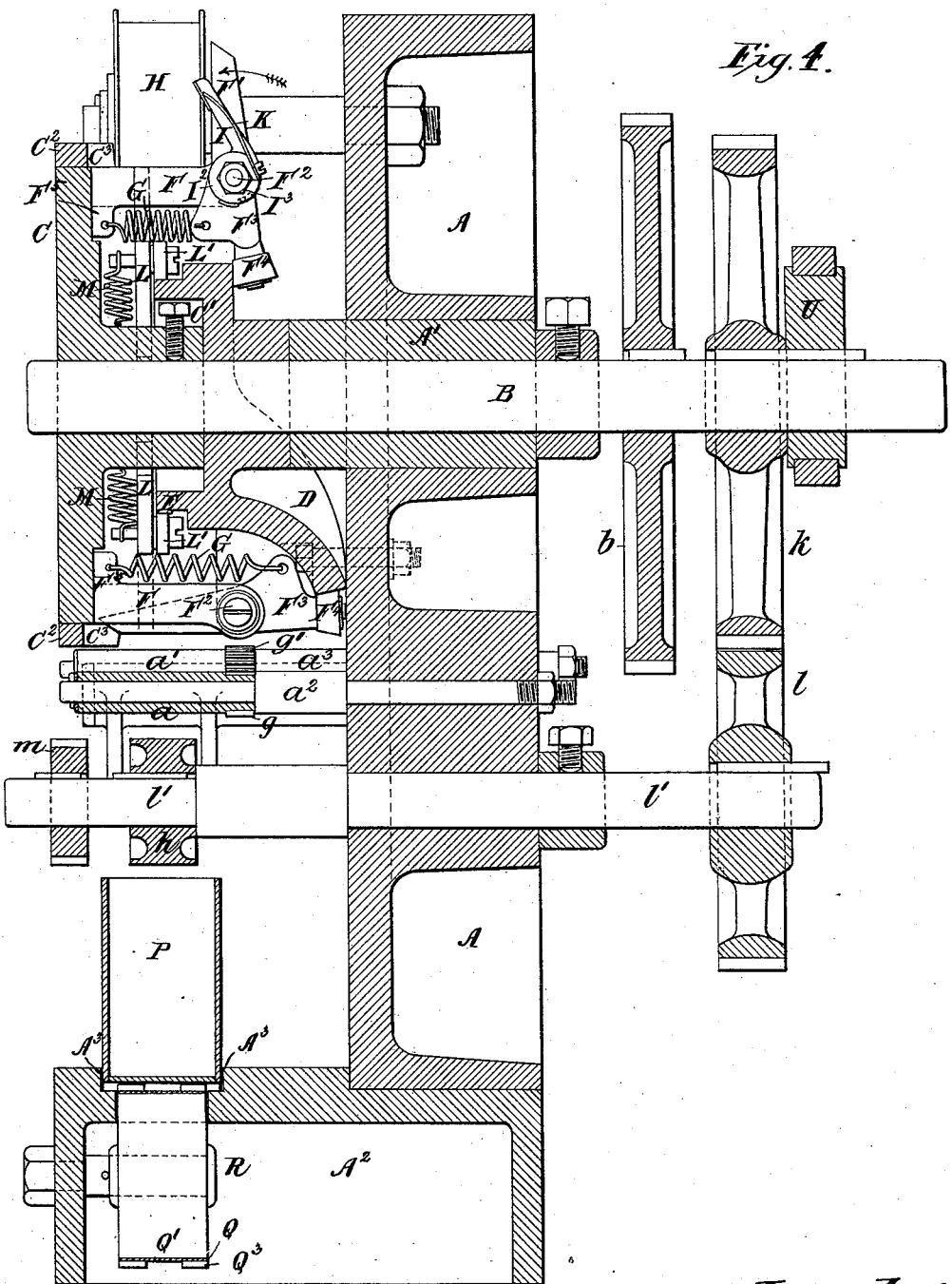

In the accompanying drawings, Figure 1 is a front elevation of a machine made in accordance with the said invention. Fig. 2 is a side elevation of the said machine with some of the parts removed. Fig. 3 is a rear elevation of the said machine. Fig. 4 is a section on the line $x$ $x$, Fig. 1; Fig. $4^a$, a detail sectional view, looking at the side of the main frame, showing the outer ends of the feed-rollers; Fig $4^b$, a detail transverse sectional view, taken through the main frame to show the devices for adjusting the feed-rollers. Fig. 5 is a rear elevation of the cutting wheel or cylinder detached. Figs. 6 to 8 show various details of construction. Fig. 9 is a plan partly in horizontal section; Fig. 10, a vertical central section; Fig. 11, a front elevation, Fig. 12 a rear elevation, and Fig. 13 a side elevation, illustrating a modification of the said invention. Fig. 14 is a rear elevation, Fig. 15 a vertical section, and Fig. 16 a plan, showing another modification of my said invention; and Fig. 17 is a front elevation showing a further modification thereof.

Like letters indicate corresponding parts throughout the drawings.

A indicates the frame of the machine. B is a shaft which is supported in a bearing, A', in the said frame, and on which the cutting wheel or cylinder C is secured by a set-screw, C'. This shaft is to be connected by a belt and pulleys or suitable gearing with a steam-engine or other motor, or provided with means for rotating it by hand.

D E are two cams formed in one piece, which is fitted loosely upon the shaft B, and is bolted or otherwise secured to the frame A.

The cutting-wheel C is made with slots or spaces at regular intervals around its periphery, in each of which slots is firmly fixed one blade, F, of a pair of shears. Each pair of shears has a movable blade, F', which is pivoted at $F^2$ to the fixed blade F, and is made with a tail-piece, $F^3$, provided with a conical anti-friction roller, $F^4$. The rollers $F^4$ are arranged to run upon the surface of the cam D as the cutting-wheel C is rotated.

G G are springs, each of which is attached at one end to a projection, $F^5$, on one of the fixed blades F, and at the other end to the tail-piece $F^3$ of one of the movable blades F'. These springs tend to keep the shears open.

H indicates the continuous strip of paper or other material from which the tickets are to be cut. This strip is conducted from the reel on which it is wound, and which is supported in any convenient manner, or from the printing and numbering mechanism, when such is combined with my apparatus. The said strip is passed around a pulley, H', and around the cylinder C and between the delivering-rollers, hereinafter described.

The cam D is of such form, and is so arranged relatively to the wheel C and shears F F', that as the said wheel rotates the cam D gradually and successively closes the shears, so that they cut the tickets from the continuous strip as it moves around with the said wheel, and then permits the opening of the said shears by the springs G.

Instead of the cam D, a double cam is sometimes employed, which will open, as well as close, the shears at the proper times. The springs G are in this case dispensed with.

$C^2$ is a ring or flange fitted upon the wheel C, to prevent lateral displacement of the strip of paper by the blades F' when cutting. If desired, however, this flange may be formed on the said wheel; or I may form a groove or channel in the periphery of the wheel, or provide other means for preventing lateral displacement of the strip. The ring or flange $C^2$ is made with slots $C^3$, to permit the proper movement of the blades F'.

I I are metal fingers, designed to press the tickets against the wheel C while they are being severed from the strip by the shears and until they are received between the first pair of delivering-rollers, hereinafter described. These fingers are carried by the screw-bolts $F^2$, which form the pivots of the shears. The said fingers require to be so arranged that each of them will move with the corresponding blade F' of the shears until it comes into contact with the ticket, and will then remain stationary during the cutting of the ticket, and afterward move back with the blade F'. For this purpose each finger is fitted to turn upon a projecting part, I', of a ring or collar, $I^2$, (see Fig. 8,) which is placed upon the bolt $F^2$, and secured thereon by a nut, $I^3$. A pin or stud, $I^4$, is provided upon the ring or collar $I^2$, and projects into a notch or recess, $I^5$, in the finger I. A spring, K, is attached to the ring or collar $I^2$, and bears upon the finger I, so as to hold its projection $I^4$ against one side of the notch $I^5$, as shown in Fig. 4. The bolt $F^2$ is fitted to rotate in the fixed blade F of the shears, and is screwed into the movable blade F' thereof. The ring or collar $I^2$ is fitted loosely on the said bolt, but is firmly held in position thereon by the nut $I^3$, which acts as a lock-nut. Therefore the movable blade F', the collar $I^2$, and the spring K will move together. When the blade F' is turned in the direction indicated by the arrow in Fig. 4, the spring K acts upon the finger I and moves it in the same direction until the said finger presses the ticket against the wheel C. The continued movement of the blade F' and collar $I^2$ then compresses the spring K, the pin or stud $I^4$ moving freely in the notch $I^5$, and the finger I remains stationary until acted upon by the said pin or stud in the return movement of the blade F' and collar $I^2$.

The ring or collar $I^2$ and the finger I can be adjusted to any desired position relatively to the shears by slackening the nut $I^3$ and turning them in either direction on the bolt $F^2$. They can then be secured in position by screwing up the said nut. The fingers I should be adjusted so that they will commence to press upon the tickets at the moment when, or just before, the shears begin to cut.

L L are pins or rods fitted to slide in radial holes in the boss or hub and in the periphery of the wheel C. Each rod L is provided with an anti-friction roller, L', which, when the wheel C is rotated, runs upon the surface of the cam E. Each of the said pins or rods is, moreover, acted upon by a spring, M, which tends to keep its roller L' pressed against the surface of the said cam. This cam is of such form and is so arranged relatively to the said rods L that after a ticket has been severed from the strip, and while it is held at or near its rear end by one of the fingers I, the corresponding rod L will be pushed outward by the cam E, and will move the forward end of the ticket against a guide, N, attached to the frame A. The ticket is thus guided or directed into its proper position relatively to the first pair of delivering-rollers, $a$ $a'$, as shown in Fig. 1. The said rod L is subsequently moved back to its original position by its spring M.

Instead of the cam E, a double cam is sometimes employed, which will impart a positive to-and-fro motion to the rods L. The springs M are in this case dispensed with.

The delivering-rollers $a$ $a'$ are fitted to rotate upon studs or shafts $a^2 a^3$, fixed in the frame A. The said rollers receive motion from the shaft B through a toothed wheel, $b$, which is geared by means of an intermediate wheel, $c$, with a pinion, $d$, fixed on the shaft $e$. A toothed wheel, $f$, is also fixed on the shaft $e$ and gears with a pinion, $g$, formed on or secured to the roller $a$ and gearing with a similar pinion, $g'$, formed on or secured to the roller $a'$. The said rollers are arranged to deliver the tickets to a second pair of delivering-rollers, $h$ $h'$, to which the ticket is guided or directed by a plate, $i$, attached to the frame A and projecting downward over the roller $h'$. The rollers $h$ $h'$ receive motion from the shaft B through a toothed wheel, $k$, which is fixed on the said shaft and gears with a pinion, $l$, fixed on the shaft $l'$, carrying the roller $h$. A pinion, $m$, is also fixed on the shaft $l'$ and gears with a pinion, $m'$, on the shaft $l^2$, carrying the roller $h'$.

It will be seen that as a ticket is fed forward by the rollers $a$ $a'$ it will move toward the axis of the roller $h'$ until it comes in contact with the guide $i$. It will then be deflected toward the adjacent surfaces of the rollers $h$ $h'$. By this arrangement, when the forward end of the ticket is gripped between the rollers $h$ $h'$, its rear end, as soon as it passes out from between the rollers $a$ $a'$, will spring toward the plate $i$, so that the said ticket will assume a position tangential to the rollers $h h'$, and the next ticket fed forward by the rollers $a$ $a'$ will be delivered behind it. The delivery of each ticket behind the preceding ticket is thus insured. Moreover, the gearing is so proportioned that the circumferential velocity of the rollers $h$ $h'$ is less than that of the rollers $a$ $a'$. Therefore, before one ticket has passed between the rollers $h h'$ another ticket or other tickets will be fed forward by the rollers $a a'$ and gripped by the rollers $h$ $h'$. The tickets are thus caused to overlap one another as they pass between the delivering-rollers $h$ $h'$, and the delivery of the tickets in consecutive order is insured.

To permit the passage of two or more tickets simultaneously between the rollers $h\ h'$, and at the same time insure sufficient pressure upon a single ticket as it is passed between the said rollers, the shaft $l^2$ and roller $h'$ are carried by the short arm $n'$ of a lever, $n$, pivoted at $n^2$ to the frame A, the long arm of which lever is provided with a weight, $n^3$. A spring may, if desired, be combined with the lever $n$ for this purpose, instead of the weight $n^3$.

To permit the adjustment of the roller $a$ relatively to the roller $a'$, I make the stud or shaft $a^2$ with an eccentric shank, $a^4$, which is held by a nut, $a^5$, in the frame A, as shown in Figs. 1, 4, and 4$^a$. The roller $a$ can by these means be moved nearer to or farther from the roller $a'$, (to suit materials of different thickness,) by slackening the nut $a^5$ and turning the stud or shaft $a^2$ in one or the other direction, and then tightening the nut to secure the said stud or shaft in the desired position.

P is a box or trough for receiving the tickets from the delivering-rollers $h\ h'$. This trough is fitted to slide between guides A$^3$ on a plate or table, A$^2$, attached to or forming part of the frame A. It is divided longitudinally into compartments, each of which will contain, say, fifty tickets. In combination with this trough I arrange an endless belt, Q, which is carried by pulleys Q' Q$^2$, mounted upon shafts R R'. This belt is provided with projections Q$^3$, which engage with projections P' on the bottom of the trough P for the purpose of moving the said trough forward intermittently as the tickets are fed into the same. On the shaft R' is fixed a ratchet-wheel, S, the teeth of which are divided into series or groups of six. The sixth tooth of each group is shorter (say by one-sixteenth of an inch) than the other teeth thereof.

T is a lever which is pivoted upon the shaft R' and carries a pawl, T', which engages with the ratchet-wheel S.

U is an eccentric which is fixed upon the shaft B, and the rod U' of which is coupled to the lever T. When the shaft B is rotated, the lever T is moved backward and forward by the eccentric U in such a manner that the ratchet-wheel S is intermittently rotated by the pawl. The stroke of the pawl is less than the length of two of the longer teeth of the ratchet-wheel by, say, one-sixteenth of an inch. Therefore the said pawl will engage with four teeth successively, one tooth at a time, and will then pass over the fifth tooth and engage with the sixth tooth. This arrangement is necessary, in order that when one of the compartments of the trough has been filled the said lever shall push the trough forward a distance equal to the thickness of, say, ten tickets, plus the thickness of the partition between the compartments, and thus divert the stream of overlapping tickets from one compartment to another compartment. Before one of these troughs is completely filled with tickets another trough of similar construction can be placed behind it, so that the belt Q will move the two troughs forward together. The necessity for stopping the machine to remove the full trough and substitute an empty trough therefor is thus obviated.

Instead of using the means above described for receiving the tickets from the delivering-rollers, I sometimes employ for this purpose the device shown in Figs. 9 to 13, in which $p$ is a wheel arranged to rotate in a horizontal plane upon a pin or stud, $p'$, fixed in the plate or table A$^2$. $q$ is an annular trough, which is divided into compartments and is provided with one or more pins or projections, $q'$, fitting into a hole or holes in the wheel $p$. This annular trough can be readily removed and a similar trough substituted therefor. $r$ is a ratchet-wheel, which is secured to the under side of the wheel $p$. The teeth of this ratchet-wheel are arranged in groups of five, with spaces equal to the length of one tooth between adjacent groups, as shown.

$s\ t$ are two retaining-pawls, which are pivoted at $s'\ t'$ to the plate A$^2$. These pawls are acted upon by springs $s^2\ t^2$, which tend to push them into engagement with the ratchet-wheel $r$. The said pawls are, moreover, arranged in combination with a bar, $u$, fitted to slide in guides $u^*$ on the frame A, and actuated by means of a lever, $v$, and an eccentric, $v'$, fixed on the shaft B. The said bar $u$ is provided with two inclined surfaces, $u'\ u^2$, arranged to act upon pins or studs $s^3\ t^3$ in the pawls $s\ t$ in such a manner that as the said bar moves to and fro it will alternately disengage the pawls $s\ t$ from and permit their engagement with the ratchet-wheel $r$, one of the said pawls engaging with the said ratchet-wheel when the other pawl is disengaged therefrom.

The wheel $p$ is made with a peripheral groove, $p^2$, and a cord, $w$, is wound around and attached at one end to the said wheel. This cord is passed over the pulleys $w'\ w^2$, and a weight, $w^3$, is attached to its other end. This weight tends to impart rotary motion to the wheel $p$ and ratchet-wheel $r$ in the direction indicated by the arrow in Fig. 9. Therefore, when the pawls $s\ t$ are alternately disengaged from and permitted to engage with the ratchet-wheel, as above described, the latter will be intermittently rotated by the weight $w^3$. The relative arrangement of the parts is such that for every ten tickets, up to forty, delivered into a compartment of the trough $q$ the ratchet-wheel $r$ will be rotated through a distance equal to the length of one tooth; but when fifty tickets have been delivered into the said compartment the said ratchet-wheel will be rotated through a distance equal to the length of two teeth, (or to the length of one tooth plus that of the space between two groups of teeth,) to bring another compartment of the trough beneath the rollers $h\ h'$. By these means the tickets will be arranged in bundles or packets, each containing a certain number of tickets, (in the above instance fifty.)

It is obvious that other convenient means may, if desired, be employed for receiving the tickets from the delivering-rollers.

It is, moreover, obvious that any suitable number of pairs of shears may be arranged around the wheel C, and that other means than the stationary cams above described may be employed, whereby the shears and the pins or rods L will be operated when the wheel C is rotated.

In Figs. 14, 15, and 16 I have illustrated a modification of my invention, wherein I make the movable blades F' with teeth, as at F⁶, which gear with toothed racks F⁷. These racks are provided with anti-friction rollers F⁸, fitting into the groove D' of a cam, D, whereby they are moved to and fro to operate the said blades F'.

Fig. 17 shows a modification of the devices shown in Figs. 1 to 4 for feeding forward the trough P. In this modification the shafts R R' are connected by means of a shaft, R², and suitable bevel-pinions. On each of the shafts R R' are fixed two ratchet-wheels, Y Y'. The wheel Y is adapted to engage with teeth or projections on the under side of a trough to feed the same forward, and is designed to be used when thin material is used for the tickets. The wheel Y' is adapted to engage with teeth on the side of a trough, and is designed to be used when thick material is employed for the tickets, so that it will feed the trough through a longer distance in each movement of the ratchet-wheel S.

My apparatus may be used for cutting and delivering or collecting either a single row or two or more rows of tickets, the printing mechanism being multiplied and the shears being made of sufficient length to divide the whole of the rows of tickets. Suitable mechanism may be provided in this case for cutting the strips longitudinally.

I have illustrated several pairs of shears on the rotary disk or cylinder, but wish it to be understood that I do not confine myself to any particular number of shears, as I may employ one pair, or more than one pair.

What I claim is—

1. In an apparatus for cutting tickets or pieces from paper, card-board, or similar material, the combination of a rotary disk or cylinder, a pair of shears carried thereby and consisting of a fixed blade and a movable blade, a spring-finger actuated by said movable blade, and means, such substantially as described, for operating said shears as the cylinder rotates, for the purpose above specified.

2. In an apparatus for cutting tickets or pieces from paper, card-board, or similar material, the combination of a rotary disk or cylinder having radial holes, pairs of shears carried by the disk or cylinder and each consisting of a fixed blade and a movable blade pivoted thereto, spring-fingers actuated by the movable blades of the shears, sliding pins or rods arranged within the radial holes in said disk or cylinder, and means, such substantially as described, for operating said shears and said sliding pins or rods, all substantially as and for the purposes set forth.

3. In an apparatus for cutting tickets or pieces from paper, card-board, or similar material, the combination of a rotary disk or cylinder carrying pairs of shears, each consisting of a fixed blade and a movable blade pivoted thereto, sliding pins or rods arranged within said disk or cylinder, and means, such substantially as described, for operating said shears and said sliding pins or rods, all substantially as and for the purposes set forth.

4. The combination, in an apparatus for cutting tickets or pieces from paper, card-board, or similar material, of a rotary disk or cylinder carrying cutting-shears, and means, such substantially as described, for operating the shears during the rotation of the cylinder, with a partition-trough arranged under the disk or cylinder, and an intermittently-moving endless belt engaging the trough for correspondingly moving the same, substantially as described.

5. The combination, in an apparatus for cutting tickets or pieces from paper, card-board, or similar material, of a rotary disk or cylinder carrying cutting-shears, and means, such substantially as described, for operating said shears during the rotation of said disk or cylinder, with a partition-trough, means, such substantially as described, for intermittently moving the trough, and means, such substantially as described, for feeding the tickets or pieces from said disk or cylinder into said trough, all substantially as described.

6. The combination, with the rotating disk or cylinder C, of the fixed blades F, the movable blades F', pivoted to said fixed blades and provided with the anti-friction rollers F⁴, the spring-fingers I, also pivoted to said fixed blades and actuated by said movable blades, the cam D, and the retracting-springs G, substantially as and for the purposes set forth.

7. The combination, with the rotating disk or cylinder C, of the fixed blades F, the movable blades F', pivoted to said fixed blades and provided with the anti-friction rollers F⁴, the spring-fingers I, also pivoted to said fixed blades and actuated by said movable blades, the sliding pins or rods L, provided with the anti-friction rollers L', the cams D E, and the springs G M, all substantially as and for the purposes set forth.

In testimony whereof I have hereunto signed my name in the presence of two subscribing witnesses.

WALTER RATHBONE BACON.

Witnesses:
JOHN E. BOUSFIELD,
WALTER MORRIS.